United States Patent [19]

Shinmei et al.

[11] Patent Number: 4,708,594
[45] Date of Patent: Nov. 24, 1987

[54] METHOD OF STARTING A VARIABLE-SPEED PUMP TURBINE OR A VARIABLE SPEED PUMP

[75] Inventors: Katsumasa Shinmei; Kazuo Niikura, both of Hitachi, Japan

[73] Assignee: Hitachi, Ltd., Tokyo, Japan

[21] Appl. No.: 811,744

[22] Filed: Dec. 20, 1985

[30] Foreign Application Priority Data

Dec. 21, 1984 [JP] Japan .................................. 59-271612

[51] Int. Cl.[4] .............................................. F04B 49/00
[52] U.S. Cl. ........................................ 417/53; 417/23; 417/29; 417/42; 417/45
[58] Field of Search ..................... 417/18, 22, 23, 26, 417/28, 29, 42, 45, 53

[56] References Cited

U.S. PATENT DOCUMENTS

| | | | |
|---|---|---|---|
| 3,957,395 | 5/1976 | Ensign | 417/53 X |
| 4,204,808 | 5/1980 | Reese et al. | 417/53 X |
| 4,586,870 | 5/1986 | Hohlweg et al. | 417/26 X |

FOREIGN PATENT DOCUMENTS

| | | | |
|---|---|---|---|
| 140115 | 10/1979 | Japan | 417/45 |
| 98675 | 7/1980 | Japan | 417/18 |
| 41476 | 4/1981 | Japan | 417/18 |
| 60889 | 5/1981 | Japan | 417/53 |
| 77566 | 6/1981 | Japan | 417/53 |
| 59084 | 4/1982 | Japan | 417/28 |
| 145392 | 8/1984 | Japan | 417/45 |

Primary Examiner—Leonard E. Smith
Assistant Examiner—Paul F. Neils
Attorney, Agent, or Firm—Fay, Sharpe, Beall Fagan, Minnich & McKee

[57] ABSTRACT

A method of starting a variable-speed pump turbine or a variable-speed pump driven by a variable-speed generator motor or a variable-speed motor connected to an electric power line in parallel therewith. The generator motor or the motor is first operated at low speed with the guide vanes or the delivery valve fully closed. The low speed is lower than a stable starting speed of the pump turbine or the motor but high enough to prevent backward flow of water into the pump turbine or the pump. After the operation is set at the low speed, the guide vanes or the delivery valve are opened and the opening degree is gradually opened until the speed is increased to a speed optimum for the steady operating condition of the pump turbine or pump. This method effectively suppresses abrupt increase in the pump input power required for the driving of the pump turbine or the pump, whereby unfavorable effect on the electric power line is avoided advantageously.

6 Claims, 6 Drawing Figures

METHOD OF STARTING A VARIABLE-SPEED PUMP TURBINE OR A VARIABLE SPEED PUMP

BACKGROUND OF THE INVENTION

The present invention relates to a method of starting a hydraulic machine such as a variable speed pump turbine or a variable speed pump.

Japanese Pre-examination Patent Publication No. 126675/1981 discloses a method in which the speed of a pump turbine in a pumping-up power plant is controlled for the purpose of improving the efficiency of the plant. This literature, however, does not disclose any method which would reduce the impact on the electric power line which is caused when the pump turbine is started in the pumping mode. FIG. 3 shows the starting characteristics of a variable speed pump turbine with movable guide vanes, as observed when the pump turbine is started in the pumping mode in accordance with a conventional starting method. More specifically, in FIG. 3, the axis of abscissa represents the time, while the axis of ordinate represents the opening degree of the guide vanes, speed of the pump turbine and the pump input. As will be understood from this Figure, the conventional starting is basically such that the pump is started and operated at a constant speed with the guide vanes fully closed and, when the delivery pressure has been increased to a level above the water head of the pond applied to the delivery side of the pump turbine, the guide vanes are opened thus commencing the pumping up of the water. As will be seen from FIG. 3, the speed of the pump turbine is maintained from the time of start-up till the time of rated operation, but the pump input is drastically increased as soon as the guide vanes start to open.

FIG. 4 shows the operation characteristics of a typical pump turbine with guide vanes, as observed when the pump turbine is operating at a constant speed No. More specifically, in this Figure, the axis of abscissa represents the flow rate, while the axis of ordinate represents the pump input and the delivery head. It will be seen that the pump input when the guide vanes are fully closed, i.e., when the flow rate is zero, is not negligible with respect to the rated pump input. It will be seen also that the pump input is ruled by the pumping-up rate but is materially independent from the opening degree of the guide vanes. FIG. 4 is intended for explanation of the fact that the pump input is drastically increased in accordance with the increase in the guide vane opening GVO as explained in FIG. 3. The points B, C, D and E which are plotted on the pump input curve and the guide vane opening curve in FIG. 3, as well as on the input curve in FIG. 4, respectively correspond to points B, C, D and E on the load curve shown in FIG. 4.

When the pump is started at constant speed No and constant head Ho as in the conventional method, the operation point of the pump is progressively moved from the point A corresponding to the fully closed state of the guide vanes to the normal steady operation E where the guide vane opening GVO is 100%, past the points B, C and D at which the guide vane opening is 40%, 60% and 80%, respectively, along the load curve shown in FIG. 4. The term "load curve" in this case is used to mean a curve which represents the relationship between the delivery head and the flow rate obtained when the water level is assumed to be constant taking into account the loss of head along the penstock.

FIG. 5 shows the changes in the pump input during starting of the pump turbine along the load curve from the point A to the point E for each of a high, medium and low delivery heads. It will be seen that the pump input is drastically increased as the guide vanes are opened, however the guide vane opening GVO may be small.

On the other hand, in the operation range in which the guide vane opening is extremely small, the operation is unstable due to pulsation of the water pressure and consequent vibration of the mechanical parts. From the view point of durability, therefore, it is not preferred to maintain the pump turbine in this state for a long time. In the conventional starting method, the pump is started at a constant speed of the pump turbine, so that the pump input tends to increase immediately after the start of the pumping up operation as shown in FIG. 3, causing a heavy impact and influence on the electric power line. This problem cannot be overcome insofar as the pump turbine is started at a constant speed because of the facts that the pump input is considerably large even when the guide vanes are fully closed, that the pump input is rather insensitive to the guide vane opening after reaching steady operation (FIG. 5 and point E in FIGS. 3 and 4) and that the operation is unstable when the guide vane opening is extremely small.

FIG. 6 shows the operation characteristics of a variable-speed pump in which the axis of abscissa represents the flow rate, while the axis of ordinate represents the input and the head in the form of envelope curves. In this case, however, the guide vane opening curve is omitted for the purpose of clarification of the Figure, and the characteristics as obtained with the guide vane opening which provides the optimum operating condition, i.e., the maximum efficiency, are shown by the envelope curves. Thus, characteristics for different guide vane openings are obtainable in the same way as in FIG. 4, although such characteristics are not shown in FIG. 6. In FIG. 6, the operation speed No is the operation speed during steady operation, necessary for attaining the desired flow rate Qo and the input Po at a given delivery head Ho. On the other hand, $N_1$ is the stable starting speed at which the downward convexity of the QH curve takes a value slightly above the load curve obtained with the static head Ho, and $N_2$ is the minimal starting speed at which the delivery head with the guide vanes fully closed takes a value slightly above the head Ho.

In starting the pump along the load curve corresponding to the delivery head Ho, if the guide vanes are opened after a guide-vane full close operation at a pump speed below the minimal starting speed $N_2$, the water flows backwardly into the pump because the static head Ho is higher than the pump delivery pressure.

If the guide vanes are opened after the guidevane full close operation at the minimal starting speed $N_2$, the pump operation cannot be shifted to the normal steady operation Z if this speed is maintained. For shifting the operation to the point Z, it is necessary to increase the pump speed without delay. In such a case, the point of operation is moved from $X_2$ to Z past Y, whereas the input is changed from a point $J_2$ to a point L past a point near a point K.

If the guide vanes are opened after guide-vane full close operation at the stable starting speed $N_1$, the pump operation speed is automatically moved from the guide-vane full close position $X_1$ to the stable operation point Y along the load curve, without requiring acceleration from the speed $N_1$. Then, the operation point is further shifted to the point Z in accordance with an increase in the pump speed. Meanwhile, the pump input is shifted from the point $J_1$ to the point L past the point K.

In the conventional starting method, the pump operates at the speed No which corresponds to a head Xo which is higher than the point $X_1$ or $X_2$ which in turn are higher than the head Ho. When the guide vanes are opened in this state, the pump input is increased from the point Jo to the point L. As stated above, the rate of increase in the pump input can be reduced if the pumping of water is commenced at the speed $N_2$ or $N_1$. Unfortunately, however, the conventional method starts the pumping operation by opening the guide vanes while the pump is operating at a constant high speed. With this conventional method, therefore, the pump input is inevitably increased drastically when the pumping is commenced, causing unfavourable effect on the electric power line.

SUMMARY OF THE INVENTION

Accordingly, an object of the invention is to provide a method of starting a variable-speed pump turbine or a variable-speed pump, which is capable of preventing any abrupt increase in the power at the time of the starting.

To this end, according to the invention, there is provided a method of starting a hydraulic rotary machine, such as a variable-speed pump turbine or a variable-speed pump having guide vanes disposed around the runner or a delivery valve connected to the delivery side of the pump, the runner of the pump turbine or the pump being driven by a variable-speed generator motor or a variable-speed motor connected to an electric power line in parallel therewith, the method comprising: operating the generator motor or the motor at a low speed with the guide vanes of the delivery valve fully closed, the low speed being lower than a stable starting speed of the pump turbine or the motor but high enough to prevent backward flow of water into the pump turbine or the pump; commencing, after the operation is set at the low speed, opening of the guide vanes or the delivery valve and increasing the opening until the speed is increased to a speed optimum for the steady operating condition of the pump turbine or pump.

DESCRIPTION OF THE PREFERRED EMBODIMENTS·

Figure 1:
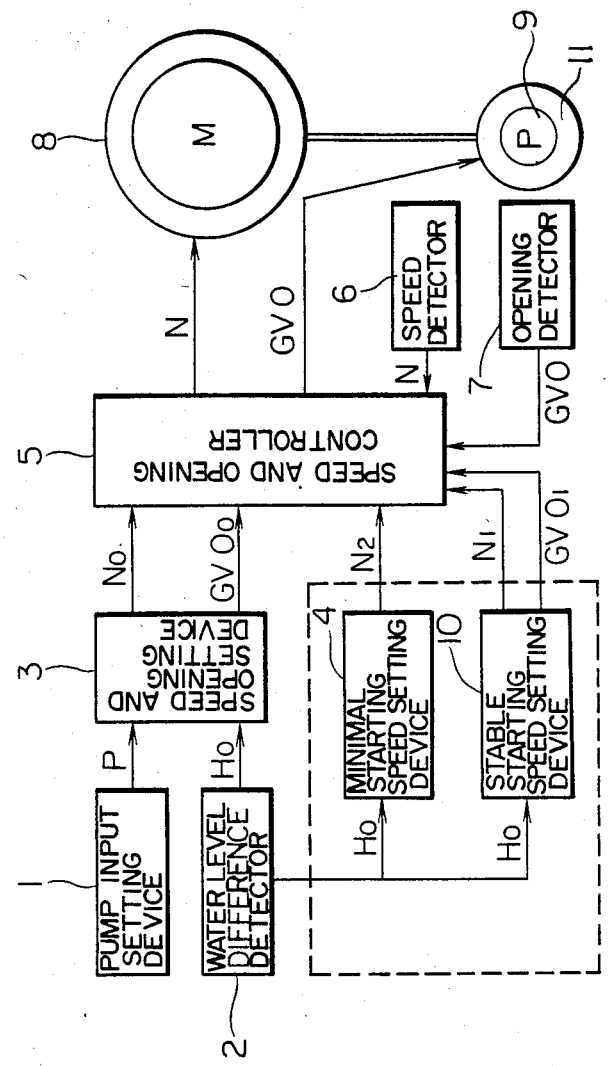
FIG. 1 is a block diagram of a starting system of an apparatus which is suitable for carrying out a method of the invention for starting a variable-speed pump turbine or a variable-speed pump.

An embodiment of the method of the present invention for starting a variable-speed pump turbine or a pump will be described hereinunder with specific reference to FIG. 1 which is a block diagram of a starting system suitable for carrying out the method of the invention. This starting system has a pump input setting device 1, a water level difference detector 2, a speed and opening setting device 3 for setting an optimum speed or an optimum guide vane opening, a minimal starting speed setting device 4, and a speed and opening controller 5 for controlling the speed and the guide vane opening such that the speed does not come under the minimal speed to the motor operating as a motor 8 or the generator motor connected to the pump or the pump turbine 9. The system further has a speed detector 6 for detecting the rotation speed of the pump turbine or the pump 9, an opening detector 7 for detecting the opening of the guide vanes 11 and a stable starting speed setting device 10.

In the conventional starting method, a pump input is set by the pump input setting device 1 in accordance with, for example, the surplus electric power, while a static head Ho is detected by the water level difference detector 2. Using the pump input P and the static head Ho, the optimum speed and opening setting device 3 sets an optimum rotation speed No and an optimum guide vane opening GVOo, and are inputted to the speed and opening controller 5. The speed and opening controller 5 controls the rotation speed of the pump turbine or the pump and the opening of the guide vanes, through a feedback of the measured rotation speed N and the guide vane opening GVO, such that the actual speed and the guide vane opening coincide with the optimum speed No and opening GVOo, thus accomplishing the starting up at the high constant speed No.

The starting system for carrying out the invention is additionally provided with the minimal starting speed setting device 4 and the stable starting speed setting device 10 which are enclosed by a broken-line square in FIG. 1. The minimal starting speed setting device 4 determines, in accordance with the output from the water level difference detector 2, the minimal starting speed $N_2$ (generally 85 to 95% of the optimum speed in the steady operating condition) which does not cause backward flow of the water, and inputs this minimal starting speed to the speed and opening controller 5. At the same time, the stable starting speed setting device 10 determines, in accordance with the output from the water level difference detector 2, a stable starting speed $N_1$ (generally 90 to 99% of the optimum speed in the steady condition) at which the downward convexity of the pump characteristics curve does not cause any problem in the steady operation of the pump, and also a stable start vane opening $GVO_1$ corresponding to the stable starting point. The thus set stable starting speed $N_1$ and the stable start vane opening $GVO_1$ are delivered also to the speed and opening controller 5.

Thus, in the described embodiment of the invention, the speed and opening controller 5 receives the signals representing the minimal starting speed $N_2$, stable starting speed $N_1$ and the stable start vane opening $GVO_1$ corresponding to the stable starting speed $N_1$, in contrast to the conventional system in which the speed and opening controller 5 receives signals representing the optimum speed No and the optimum guide vane opening GVOo at the steady operation.

Figure 2:
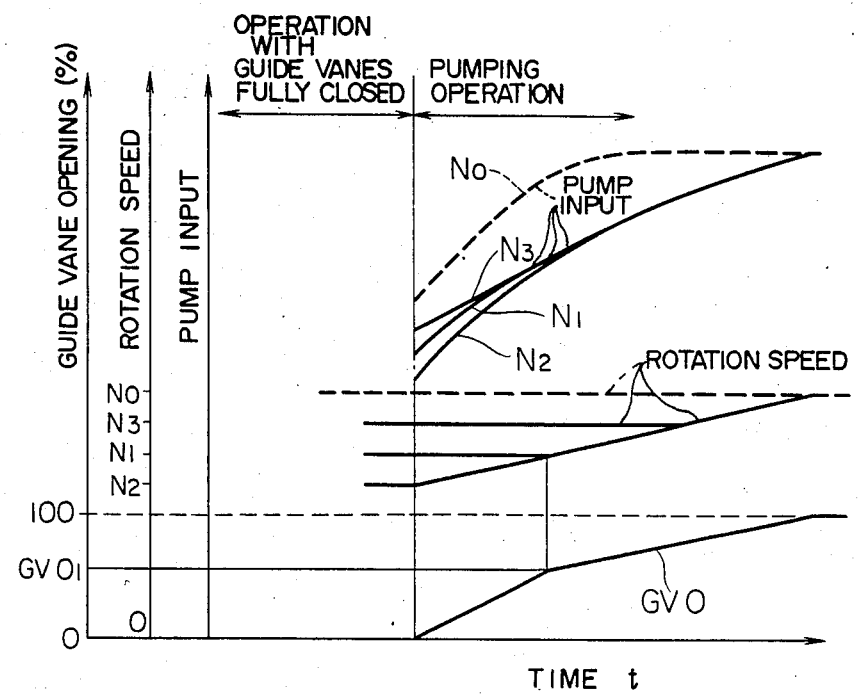
FIG. 2 is a diagram showing the guide vane opening, rotation speed and the pump input as observed when a pump turbine or a pump is started by the apparatus shown in FIG. 1.
Figure 3:
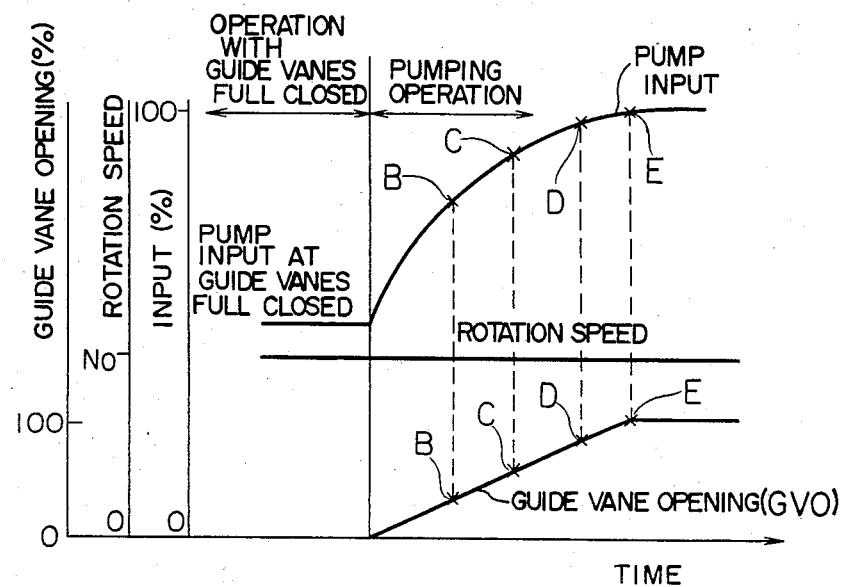
FIG. 3 is a diagram showing the guide vane opening speed and the pump input as observed when a variable-speed pump turbine or a pump is started by a conventional starting method.
Figure 4:
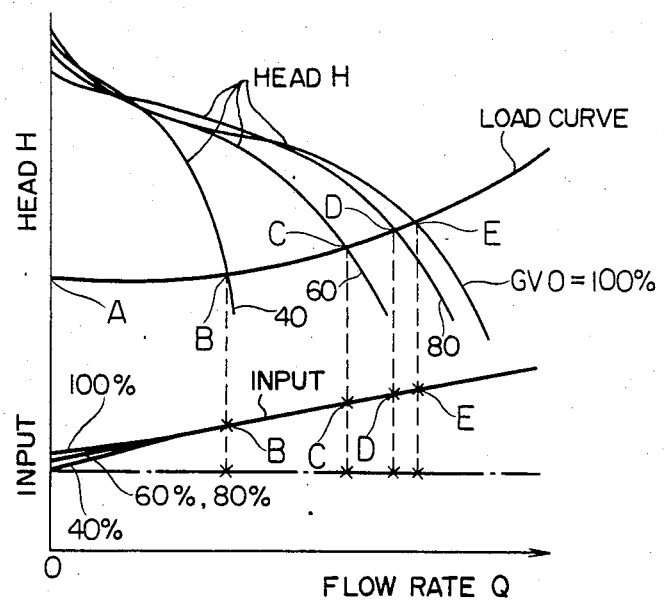
FIG. 4 is a diagram showing the operation characteristics of the pump at a normal operation speed.
Figure 5:
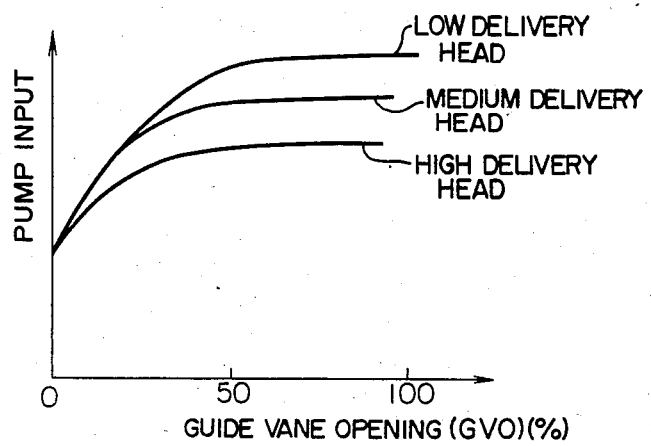
FIG. 5 is a diagram showing a change in the pump input in accordance with a change in the pump input, as observed when the pump is operating at the normal constant speed.
Figure 6:
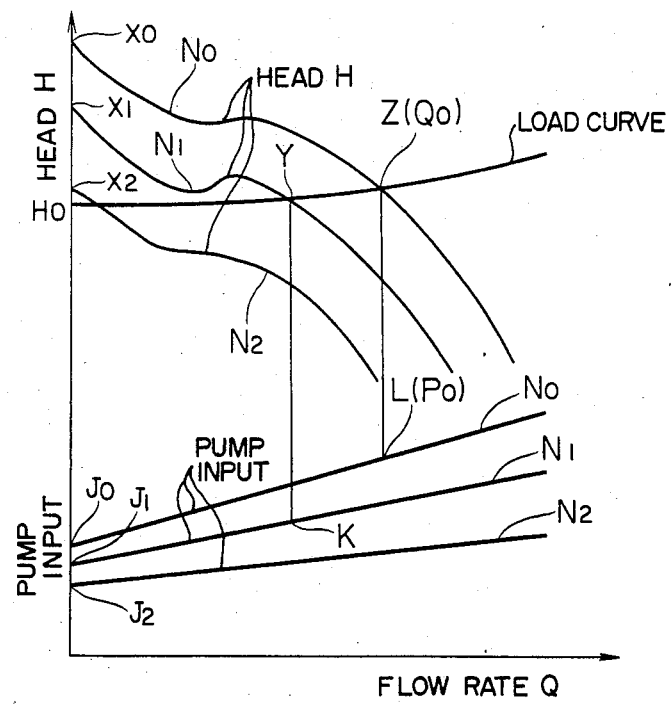
FIG. 6 is a diagram showing, in the form of envelop curves, the operation characteristics of a known variable-speed pump.

FIG. 2 shows the characteristics of the pump turbine or the pump started in accordance with the method of the invention. In this Figure, the axis of abscissa represents the time, while the axis of ordinate represents the guide vane opening, rotation speed and the pump input. The broken-line curve represents the pump input which is required when the pump turbine or the pump is started at the rated speed No in accordance with the conventional starting method. For starting the pump by the starting method of the invention, the pump turbine or the pump is first operated at the minimal starting speed $N_2$ with the guide vanes fully closed and while the speed is maintained at the minimal starting speed $N_2$, the guide vanes are opened, the speed is increased such that the speed reaches the stable starting speed $N_1$ when the guide vanes have been opened to the stable start vane opening $GVO_1$. In this case, the speed $N_2$ is the minimal control speed set in the speed and opening controller 5 which in turn may be determined by the minimal speed peculiar to the generator motor or the generator, e.g., a rotation speed $N_3$ shown in FIG. 3. Although in the illustrated case this speed $N_3$ is higher than the speeds $N_1$ and $N_2$, this speed is in some cases below the speeds $N_1$ and $N_2$. The pump operates steadily and stably at the speed $N_1$ with the stable start vane opening $GVO_1$. Thereafter, the rotation speed and the guide vane opening are increased to the designated levels No and GVOo by ordinary speed and vane opening control methods. It will be seen that the pump turbine or the pump can be started with reduced pump input as compared with the conventional case which requires a large pump input as shown by the broken-line curve in FIG. 2.

As has been described, according to the method of the invention, the guide vanes are opened when the variable-speed motor generator or the variable-speed motor for driving the pump turbine or the pump is operating at a speed which is lower than the stable starting speed but high enough to avoid the backward flow of water into the pump turbine or the pump. When this speed of the pump turbine or the pump is reached, the guide vanes or the delivery valve is opened and the opening of the vanes or the delivery valve is gradually increased and the speed is increased of the pump turbine or the pump. With this method, it is possible to suppress any drastic increase of the pump input power at the time of starting as compared with the conventional starting method in which the pumping is commenced directly at the steady running speed, thereby to suppress any unfavourable effect on the electric power line which may otherwise be caused by a drastic increase in the pump input power.

In the embodiment described hereinbefore, the pump turbine or the pump is started first at the minimal starting speed $N_1$ and the guide vanes or the delivery valve is opened at this speed. This, however, is not exclusive and the invention includes such a modification that the pump turbine or the pump is first operated at the stable starting speed $N_1$ with the guide vanes or the delivery valve fully closed and, while maintaining the speed $N_1$, the guide vanes are gradually opened to the stable start vane opening $GVO_1$, followed by an acceleration in accordance with a known speed and vane opening control method. In this case, the effect for suppressing the unfavourable influence on the electric power line is small as compared with the described preferred embodiment of the starting method but the effect is still remarkable when compared with the conventional starting method.

As has been described, the method of the invention for starting a pump turbine or a pump offers an advantage in that it remarkably suppresses abrupt increase in the pump input so as to reduce the unfavourable effect on the electric power line.

What is claimed is:

1. A method of starting a variable-speed hydraulic rotary machine such as a pump for providing a delivery head and a flow rate, having valve means for varying the opening of a pump outlet passage, comprising:
   providing a variable speed motor connected to an electric powerline for driving the pump;
   detecting a pump parameter correlated to the speed of at least one of the pump and the motor;
   driving the pump with the motor in accordance with said pump parameter detecting while the hydraulic flow rate is substantially zero with the pump outlet passage closed, and at a speed substantially lower than a steady operation speed of the pump;
   detecting a pump outlet passage parameter correlated to the opening of the pump outlet passage;
   progressively opening the pump outlet passage of the pump in accordance with said pump outlet passage parameter detecting and progressively increasing the speed of the motor driving the pump until the passage is fully opened and the steady operating condition of the pump is obtained;
   maintaining the speed increasing with the increased opening of the pump outlet passage sufficient to have the pump delivery head always above a load curve representing the relationship between the delivery head and the flow rate;
   conducting said driving so that the speed at which the pump is driven with the pump outlet passage closed is controlled to be the stable starting speed of the pump and high enough to prevent backflow of water in the pump outlet passage through the pump, wherein the stable starting speed of the pump is the speed at which the downward convexity of the head characteristic curve plotted against the pump flow rate has a value slightly above the load curve of the pump for static head.

2. The method according to claim 1, wherein said step of driving is conducted so that the stable starting speed is controlled to be generally 90 to 99% of the optimum speed of the steady condition.

3. The method according to claim 2, wherein said step of driving is conducted so that the stable starting speed is controlled to be above the minimal speed of the motor.

4. A method of starting a variable-speed hydraulic rotary machine such as a pump for providing a delivery head and a flow rate, having valve means for varying the opening of a pumping outlet passage, comprising:
   providing a variable speed motor connected to an electric powerline for driving the pump;
   detecting a pump parameter correlated to the speed of at least one of the pump and the motor;
   driving the pump with the motor in accordance with said pump parameter detecting while the hydraulic flow rate is substantially zero with pump outlet passage closed, and at a speed substantially lower than a steady operation speed of the pump;
   detecting a pump outlet passage parameter correlated to the opening of the pump outlet passage;

progressively opening the pump outlet passage of the pump in accordance with said pump outlet passage parameter detecting and progressively increasing the speed of the motor driving the pump until the passage is fully opened and the steady operating condition of the pump is obtained;

maintaining the speed increasing with the increased opening of the pump outlet passage sufficient to have the pump delivery head always above a load curve representing the relationship between the delivery head and the flow rate;

conducting said driving so that the speed at which the pump is driven with the pump outlet passage closed is controlled to be the pump minimal starting speed at which the pump delivery head with the pump outlet passage closed has a value slightly above the static head.

5. The method according to claim 4, wherein said step of driving is conducted so that the pump minimal starting speed is controlled to be 85%-95% of the optimum speed in the steady state operating condition.

6. The method according to claim 5, wherein said step of driving is conducted so that the pump minimal starting speed is controlled to be above the minimal speed of the motor.

* * * * *